United States Patent Office 3,274,141
Patented Sept. 20, 1966

3,274,141
FILM-FORMING COPOLYMER EMULSION
Gustav Pieper, Cologne-Stammheim, and Heino Logemann, Leverkusen, Germany, assignors to Farbenfabriken Bayer Aktiengesellschaft, Leverkusen, Germany, a German corporation
No Drawing. Filed July 18, 1963, Ser. No. 296,109
Claims priority, application Germany, July 21, 1962, F 37,388
2 Claims. (Cl. 260—29.7)

The present invention relates to specific five-component copolymer emulsions which are self-crosslinking on heating.

The use of aqueous emulsions of copolymers of acrylonitrile with styrene, acrylic acid or methacrylic acid and/or their esters and amides, in some cases with the addition of further polymerizable compounds, for the preparation of coatings on metals, wood, plastics, paper, textiles and similar materials by subsequent heating is already known. These coatings in many cases do not meet the necessary requirements because they already become soft and sticky at temperatures between 100 and 200° C. Furthermore, owing to the relatively large quantities of emulsifiers required for the preparation of these emulsions, the coatings are very sensitive to water, alcohols and other solvents and in many cases their electrical conductivity is too high.

It is an object of this invention to prepare stable aqueous copolymer emulsions while using only very small emulsifier amounts. Another object of this invention consists in the production of stoving lacquers which show at the same time high resistance to heat, very low electrical conductivity as well as high resistance to solvents.

It has been found that it is possible to obtain such film-forming copolymer emulsions of the above-mentioned monomers which have a low emulsifier content and which, when applied to a suitable surface, form polymer films which, when subjected to heat, undergo a self cross-linking process to produce very valuable coatings. Copolymer emulsions of this kind can be obtained by copolymerizing a monomer mixture of the following five components: 50 to 60 percent of acrylonitrile, 15 to 20 percent of styrene, 15 to 20 percent of butadiene and 2 to 7 percent of acrylamide or methacrylamide (all percentages are by weight) in aqueous emulsion, using water-soluble salts of persulphuric acid as catalysts.

A preferred method of carrying out this copolymerization process consists in mixing all the monomers with 40 to 80 percent of their weight in water, in some cases adding a portion of the emulsifier and the catalysts, and stirring the mixture to form a very finely divided dispersion which is then added either continuously or in portions to the solution of catalyst and emulsifier in the rest of the water, this solution being maintained at about 50 to 80° C. and the dispersion being added at a rate depending on the progress of polymerization.

To obtain optimum properties in the end product, it is necessary to observe the correct proportions of monomers. Higher proportions of acrylonitrile increase the hardness and brittleness of the heated film whereas the addition of butadiene and styrene control the elasticity and the possibility of subsequent cross-linking of the film when it is heated.

Acrylic acid and methacrylic acid make the product adhere firmly to metals whereas the amides of these acids probably react with the phenol resin which is almost always added, these amides therefore also contributing to the subsequent hardening of the product. Deviations from the given proportions may also impair the stability of the latex.

The emulsifiers used should form stable emulsions in the slightly acid region. The alkali metal salts (sodium or potassium salts) of sulphuric acid semi-esters of higher fatty alcohols (i.e. those containing about 10 to 20 carbon atoms), e.g. lauryl alcohol, have been found to be particularly suitable. For the reasons given above, the quantity of emulsifier should not exceed 1 percent of the monomer mixture. By using the combination of monomers according to the invention, it is possible to obtain stable emulsions even with only 0.25 to 0.75 percent emulsifier.

Polymerization may advantageously be initiated by means of potassium or ammonium persulphate used in quantities of between 0.1 and 1.5 percent of the weight of monomers, and the speed of polymerization and the degree of cross-linking of the polymer may be controlled in known manner by the quantity of catalyst used.

Polymerization is preferably carried out in the temperature region between 60 and 80° C. Below 65° C. polymerization is too slow and a soft polymer with only a slight degree of cross-linking is obtained. At temperatures above 80° C. a solid polymer which is difficult to remove separates out on the wall of the autoclave and sometimes forms lumps in the latex. It has surprisingly been found that the reaction temperatures during polymerization may either be kept constant (e.g. at 75° C.) or be gradually increased (e.g. from 72 to 78° C). If, on the other hand, the temperature is allowed to fall during the course of polymerization (e.g. from 78 to 72° C.) then no stable emulsion will be found.

The finished emulsion which is substantially or completely polymerized may be neutralized after removal of the remaining monomers e.g. with aqueous ammonia solution and, if necessary, it may be concentrated by evaporation. The properties of the coatings that can be produced from the emulsion may be varied within wide limits by adding stabilizers, plasticizers and similar products. In particular, by adding 10 to 20 percent of a water-soluble condensation product of phenols and formaldehyde, the heat resistance after stoving can be considerably improved.

The present process is suitable for covering or coating heat stable materials. The stoving temperature must, of course, be adjusted to the heat resistance of the materials being coated. The present process is particularly important for coating worked metals, particularly metal sheets, wires, wire meshes or braided wires. Apart from that, textiles, fibre fleeces, paper, glass fibre webs or strands or ceramic materials may also be covered.

The emulsion may be applied to the surface in the usual manner, e.g. by painting, spraying or immersion, and is then stoved at temperatures above 120° C. The stoving temperatures and times vary according to the apparatus used. In principle, stoving temperatures between 120 and about 400° C. may be used within the scope of the present process, the temperature depending on the length of time of the heat treatment. At the lower temperature limit given above, the heat treatment may last several hours, i.e. about 1 to 5 hours, whereas at the upper temperature limit the heat treatment may be about ½ minute or more. For example, an emulsion applied to a metal sheet may be fixed within a quarter of an hour at 180° C. in a heating chamber. On the other hand, in the usual apparatus for covering wires with lacquers, the wires are advantageously moved at a speed of about 7 to 10 metres per minute over a felt impregnated with the emulsion, and then passed through a tubular furnace several metres in length (usually about 5 metres), the temperature of the furnace being generally between 350 and 400° C.

Compared with coatings based on similar polymers, the coatings obtained by the present process are particularly resistant to boiling water and organic solvents, especially alcohols, as well as aromatic compounds, benzine hydrocarbons and halogenated hydrocarbons. At the same time, these coatings have both high heat compression strength and high shearing numbers (tested with the NEMA instrument corresponding to the U.S. standard). Of particular importance is also the high elasticity of the films obtained and the strong adhesion of the coatings to metals, as shown by the curling test. The wire lacquers produced by the process according to the invention were tested according to DIN 46 453.

The percentages given hereinafter are always percentages by weight unless otherwise indicated.

Example 1

A solution of 25 g. (0.5 percent) of 50 percent sodium lauryl sulphonate and 18 g. (0.7 percent) of potassium persulphate in 3000 cc. (120 percent) of water is stirred in an autoclave of 1.2 litres capacity at 60° C. and a mixture of 1500 cc. (60 percent) of water, 1425 g. (57 percent) of acrylonitrile, 450 g. (18 percent) of styrene, 100 g. (4 percent) of methacrylic acid, 75 g. (3 percent) of methacrylic acid amide and 450 g. (18 percent) of butadiene is added at such a rate that when the outer jacket of the autoclave is at a temperature of 60° C., the internal temperature rises from 65° to 70° C. After about 6 to 8 hours the addition of monomer mixture is completed under these conditions, and the autoclave may be released after another 2 to 4 hours. A latex with a particle size of about 0.2µ is obtained. This latex dries to a fragile layer which contains 33 percent polymer. When it is heated on the sheet metal at 180° C. for 15 minutes or when it is used for covering a wire and heated at 380° C., the wire being drawn off at a speed of 8 metres per minute, smooth, hard coatings are obtained which are very resistant to boiling water and alcohol and are found in the heat compression test to have values between 280 and 300° C. The pencil hardness of the lacquered wires is 6 to 7H when dry and 5H when kept in alcohol for one hour at room temperature. The resistance to scraping is 110.

Example 2 (A–H)

Water, sodium lauryl sulphonate as emulsifier and potassium persulphate are placed in the quantities shown in the table into a V₂H autoclave of 12 litres capacity with stirrer and a mixture of monomers (proportions by weight as in Example 1), water, potassium persulphate and lauryl sulphonate preemulsified in a second autoclave is pumped into the first mixture during 3 hours. In every case, polymerization started almost at once as soon as the preemulsified mixture was pumped in, and it was completed at the latest 2 hours after the monomers had been added. The particles of the lattices obtained decrease in size with increasing temperature, and when the lattices are used for covering wires on which they are stoved at 390° C. when the wire is drawn off at a speed of 10 metres per minute, slightly harder films are obtained.

| No. | Substances in the first autoclave | | | Quantities in the monomer mixture | | | Temperature | | Solids content in percent |
|---|---|---|---|---|---|---|---|---|---|
| | Water, cc. | Potassium-persulphate, g. | Emulsifier, g. | Water, cc. | Potassium-persulphate, g. | Emulsifier, g. | Beginning | Ends | |
| A | 3,250 | 20 | 25 | 1,500 | | 12.5 | 68 | 72 | 27 |
| B | 3,250 | 20 | 25 | 1,500 | | 12.5 | 75 | 75 | 30 |
| C | 3,250 | | 6 | 1,500 | 14 | | 72 | 73 | 30 |
| D | 3,250 | | | 1,500 | 20 | | 75 | 85 | 30 |
| E | 3,250 | | 6 | 1,500 | 14 | 20 | 80 | 73 | (¹) |
| F | 3,250 | | 6 | 1,500 | 14 | 20 | 72 | 79 | 30 |
| G | 2,625 | | 6 | 1,500 | 14 | 20 | 72 | 79 | 35 |
| H | 2,250 | | 6 | 1,500 | 14 | 20 | 71 | 75 | 38 |

¹ Precipitated.

Comparison tests A–M

Copolymer emulsions prepared by the same process as described in Example 1 but with a different composition of monomers (as shown in the table below), produce coatings with the following properties after the addition of 15 percent phenolic resin and stoving on an electrode wire (draw-off speed 9 m./min. oven temperature 380° C.).

| No. | Acrylonitrile | Styrene | Acrylic acid, butyl ester | Butadiene | Methacrylic acid | Methacryl amide | Other Monomers | Pencil Hardness | | Resistance to Scraping | Heat Compressive Strength |
|---|---|---|---|---|---|---|---|---|---|---|---|
| | | | | | | | | Dry | Alcohol | | |
| Example 1 | 57 | 18 | | 18 | 4 | 3 | | 6H | 5H | 100 | 290 |
| A | 61 | 30 | | | 4 | 5 | | 3H | H | 80 | 200 |
| B | 65 | 31 | | | 4 | | | 2H | H | 60 | 170 |
| C | 45 | 20 | | 35 | 5 | | | 3H | 4B | 30 | 160 |
| D | 45 | | | 35 | 4 | | 16 Methacrylic acid methyl ester. | 3H | 4B | 30 | 180 |
| E | 55 | 17 | 20 | | 3 | 2 | 3 divinylbenzene | 5H | H | 40 | 170 |
| F | 70 | | 20 | | 4 | 6 | | 6H | 3H | 60 | 300 |
| G | 40 | 36 | | | 5 | 3 | | 4H | H | 10 | 220 |
| H | 40 | 36 | | 18 | 5 | 3 | 18 isopren | 4H | HB | 15 | 165 |
| I | 56 | | 18 | 18 | 5 | 3 | | 4H | HB | 30 | 270 |
| K | 56 | | 18 | | 5 | 3 | 18 isopren | 4H | HB | 25 | 165 |
| L | 70 | | 20 | | 4 | 6 | | 5H | 2H | 10 | 300 |
| M | 70 | | 20 | | | | 4 Acrylic acid, 4 acryl amide. | 5H | 2H | 20 | 220 |

What is claimed is:

1. An aqueous emulsion of a film-forming acrylonitrile copolymer with self-crosslinking properties of (1) 50 to 60 percent by weight of acrylonitrile, (2) 15 to 20 percent by weight of styrene, (3) 15 to 20 percent by weight of butadiene, (4) 2 to 7 percent by weight of a member selected from the group consisting of acrylic acid and methacrylic acid, and (5) 2 to 7 percent by weight of a member selected from the group consisting of acrylamide and methacrylamide, said copolymer emulsion containing and emulsifier in an amount between 0.25 and 1% by weight based on the weight of monomers.

2. An aqueous emulsion of a film-forming acrylonitrile copolymer with self-crosslinking properties of 57% by weight of acrylonitrile, 18% by weight of styrene, 18% by weight of butadiene, 4% by weight of methacrylic acid and 3% by weight of methacrylamide, said copolymer emulsion containing an emulsifier in an amount between 0.25 and 1% by weight based on the weight of monomers.

References Cited by the Examiner

UNITED STATES PATENTS

| | | | |
|---|---|---|---|
| 2,847,404 | 8/1958 | Hoertz | 260—29.7 |
| 2,880,189 | 3/1959 | Miller et al. | 260—29.7 |
| 2,960,426 | 11/1960 | O'Mahoney | 117—128.7 |

MURRAY TILLMAN, *Primary Examiner.*

J. ZIEGLER, *Assistant Examiner.*